(12) United States Patent
Graf et al.

(10) Patent No.: US 6,394,472 B1
(45) Date of Patent: May 28, 2002

(54) STEERING KNUCKLE

(75) Inventors: Gerhard Graf, Nauheim; Lothar Harzheim, Mainz, both of (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/786,978
(22) PCT Filed: Aug. 28, 1999
(86) PCT No.: PCT/DE99/02704
§ 371 (c)(1),
(2), (4) Date: Jun. 7, 2001
(87) PCT Pub. No.: WO00/15484
PCT Pub. Date: Mar. 23, 2000

(30) Foreign Application Priority Data

Sep. 12, 1998 (DE) .......................... 198 41 811

(51) Int. Cl.⁷ ................................. B62D 7/18
(52) U.S. Cl. ................................. 280/93.512
(58) Field of Search .............. 280/93.512; B62D 7/18

(56) References Cited

U.S. PATENT DOCUMENTS 5,022,673 A * 6/1991 Sekino et al. .......... 280/93.512
6,152,466 A    11/2000 Op Den Camp

FOREIGN PATENT DOCUMENTS

| DE | 2624704 A1 | 12/1977 |
| DE | 26 24 704 A | 12/1977 |
| DE | 2913693 | * 10/1980 |
| DE | 4313624 A1 | 11/1993 |
| DE | 4313624 A1 | 11/1994 |
| DE | 19533315 C1 | 11/1996 |
| DE | 19533315 C1 | 6/1998 |
| DE | 19653542 A1 | 11/2000 |
| JP | 11208501 A | 8/1999 |
| JP | 2001-114127 | * 4/2001 |

OTHER PUBLICATIONS

Patent Abstracts of Japan, vol. 1999, No. 13, Nov. 30, 1999 & JP 11 208501 A (Suzuki Motor Corp), Aug. 3, 1999, abstract.
PCT International Preliminary Examination Report.

* cited by examiner

*Primary Examiner*—Eric Culbreth
(74) *Attorney, Agent, or Firm*—Laura C. Hargitt; Linda M. Deschere

(57) ABSTRACT

A steering knuckle structure that makes it possible to produce a light weight steering knuckle from a light metal alloy with a high degree of rigidity. A bracket for fixing a telescopic strut is provided at a vertically extending bracket wall which is supported by a bridge and wherein the area between the bridge and the bracket wall is open in a peripheral direction of the hub of the steering knuckle.

10 Claims, 1 Drawing Sheet

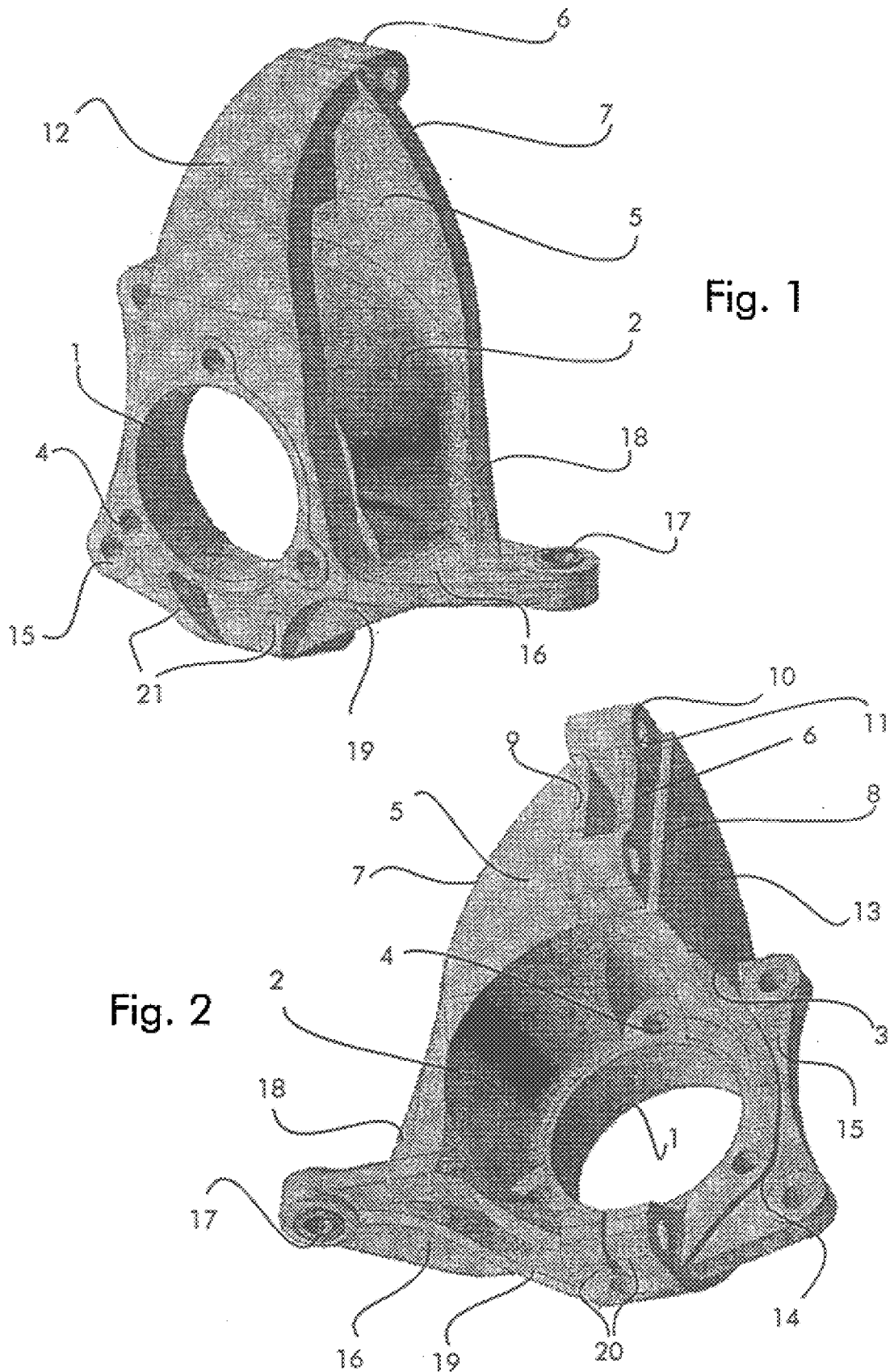

STEERING KNUCKLE

The invention relates to a steering knuckle with a hub for receiving a wheel bearing and with a bracket for fixing a control arm, especially a telescopic strut, wherein the bracket is formed on an arm projecting from the hub.

The general problem in such a steering knuckle is that on the one hand it should be very light, so that the non-dampened mass of the wheel suspension system is as small as possible and that on the other hand a high rigidity has to be provided, as all the forces for the longitudinal and transversal deceleration of the vehicle and of course the weight of the vehicle act on to it. The compromise realized up to now consists in a steering knuckle, which is made from a steel casting or iron casting.

One example for this is disclosed in DE-OS 26 24 704 A1. The casting has a hub, from which several arms project. One arm extends upwards and ends in a bracket, on which the lower end of the telescopic strut is fixed by means of two pins. To achieve the required rigidity the arm has a V-shaped cross-section.

DE 43 13 624 A1 discloses a steering knuckle made by a metal punching method. The advantage, named, compared to the casted or forged steering knuckle is the achievable weight reduction. The steering knuckle is substantially U-shaped, wherein the open side points to the vehicle. At the lower portion it is formed square for receiving a bearing, that means the legs abut approximately perpendicular the bottom of the U. The upper portion forms an arm for connecting a transverse control arm and has a semicircular cross-section. A recipient mounted there, for the ball pin of the transverse control arm has correspondingly the form of a half disc and is retained by a pin between the legs.

A similar embodiment can be taken from DE 195 33 315 C1. In this embodiment the open side of the U-shaped steering knuckle is closed by a tab and therefore is additionally reinforced. Therefore, an arm closed on all sides, is achieved.

It has been already proposed, inter alia in DE 196 53 542 A1, to use steel or iron-light weight metal alloys, such as aluminum. This material has on the one hand the advantage to be light, but also has the disadvantage of not being sufficiently rigid. Therefore, in the unexamined publication it is proposed, that the core of the steering knuckle is formed from light weight metal of higher strength as a hollow body with defined wall-thickness. Furthermore, it is clearly visible, that the manufacturing processes, necessary, are quiet cumbersome.

Therefore, the invention is based on the object, to provide a steering knuckle as light as possible, preferably made from a light metal alloy, which is simple to manufacture and having a sufficient strength a good rigidity.

In a first preferred embodiment, the steering knuckle is formed in such a way that the arm is formed by an approximately perpendicular bracket wall on whose side facing toward the vehicle the bracket is formed, and that a bridge extends between the outer end of the bracket wall and the hub, wherein the space between the bracket wall and the bridge is open to the side, i.e., open in the circumferential direction of the hub.

It has been found that because of this arrangement a high strength can be achieved, which especially can be referred back to the fact, that this arrangement is open in the circumferential direction compared to an arrangement, in which the arm has a U-shape and is open towards the vehicle. Furthermore, it has been found that the fatigue durability is increased and a compact design can be realized.

A second preferred embodiment consists of a hub that merges on the control arm side in a partial sleeve, wherein the bracket wall extends from the free end of the partial sleeve. Furthermore, one of the open sides of the chamber can be closed by a transverse wall, wherein this wall continues in a partial face on the hub, on which a bracket for fixing a brake caliper is provided.

Advantageously, the transverse wall is inserted in such a way, that its closed side extends in the driving direction, so that the arm thus formed is open to the rear in respect to the driving direction.

To be able to attach a steering rod to the steering knuckle, a support wall extending approximately horizontal is formed at the lower side of the hub or the partial sleeve, on which free end a fixing eye for the steering rod is provided. An extension of the bracket wall extends along the partial sleeve and joins perpendicularly the support wall.

Following, a detailed description by means of an embodiment will be given with reference to the drawings.

FIG. 1 shows a perspective view onto the wheel side of the steering knuckle and

FIG. 2 shows a perspective view onto the control arm side of the steering knuckle.

The wheel side designates the side of the steering knuckle, on which in the mounted condition a wheel, retained by the wheel bearing, is provided, while the control arm side designates the side, facing the vehicle. The structure of the steering knuckle will be described starting from a hub 1. All the components, described in the following, are, as far as they are represented in the drawings, formed as a single casting in the mounted state.

The hub 1 is formed by a ring serves for receiving a bearing for a wheel axle. On the side of the control arm, the hub 1 is extended axially by a partial sleeve 2, which extends in the clockwise direction from six o'clock up to approximately two o'clock, when looking onto the side of the control arm (FIG. 2). At the lower end the height of the partial sleeve is still small and only reaches its maximal amount at approximately nine o'clock. At the upper end, the slightly conically expanded partial sleeve merges in the manner of an arc with an end edge 3. On the circumference of the hub 1, three pin bores 4 for fixing the wheel bearing are distributedly provided. As far as these are provided in the area of the partial sleeve, recesses for the insertion of the pins are provided in the sleeve wall.

Starting from the free end of the partial sleeve 2 a bracket wall 5 extends with a base, which extends from around nine o'clock to two o'clock, i.e. up to the end edge 3, perpendicularly upwards, on which control arm side a bracket 6 is formed. The left side of the bracket wall 5, according to the FIG. 2, extends in a convex arc 7 while the right side ends in an approximately perpendicularly extending ending edge 8. The bracket 6 is formed by two webs 9, which extend parallel and perpendicular to the bracket wall and which upper and lower ends expand to a half round 10. The portion between these expansions is formed large and has transverse bores 11 through which the pins for fixing a telescopic strut are passed through, respectively.

The bracket wall 5 is supported by a bridge 12 on the side of the wheel. This bridge starts at the hub 1 with a width, corresponding approximately to the diameter of the hub and extends in a 90°-arc to the upper end of the bracket wall 5. Its width is reduced until it corresponds to the width of the bracket 6 in the transition to the bracket wall. In this way a space is formed which is delimited downwards by the partial sleeve 2, towards the wheel by the bridge 12 and to the control arms by the bracket wall 5.

The opening on the side, extending in the driving direction, of this space is closed by a transverse wall 13, which is clearly visible in FIG. 2. The other side remains open (see FIG. 1).

The transverse wall 13 is continuous with the end edge 8 of the bracket wall 5 and with the end edge 3 of the partial sleeve 2. Furthermore, the outer wall face adjoins flush a bent portion face 14 on the outer side of the hub 1, on which a bracket 15 for fixing a brake caliper is fixed. A support wall 16, which projects laterally and on which free end a fixing eye 17 for a control arm is formed, extends approximately tangentially to the lower end of the partial sleeve 2. The support wall 16 extends substantially horizontal and is retained by a strut 18 extending perpendicularly and which represents an extension of the bracket wall 5. This strut 18 adjoins approximately perpendicular the support wall 16 and supports this support wall from above.

Below the hub 1 a long extended and perpendicular pedestal wall 19 extends transversely, which with its one end supports the support wall 16 from below and with its other end extends substantially up to the bracket 15 for the brake caliper. At the side of the control arm of the pedestal wall 19 two bearing eyes 20 are formed, between which the lower transverse control arm of a wheel suspension system is held. On the side of the wheel of the pedestal wall 19 the bearing eyes 20 are supported by two supports 21, which are formed between the hub 1 and the pedestal wall 19 and extend towards the two lower pin bores 4.

What is claimed is:

1. A steering knuckle comprising:
   a hub adapted for receiving a wheel bearing;
   a bracket formed on a bracket wall projecting approximately tangential to the hub; and
   a bridge extending from the hub to the bracket such that a space between the bracket and the bridge is open.

2. The steering knuckle according to claim 1, wherein the bracket wall extends circumferentially from at least a portion of the hub.

3. The steering knuckle according to claim 2, wherein the bridge extends from the hub to the bracket wall.

4. The steering knuckle according to claim 2, wherein the hub extends cylindrically along the bracket wall to form a partial sleeve, and wherein the bracket wall adjoins an end of the partial sleeve.

5. The steering knuckle according to claim 4, wherein the space on one side is closed by a transverse wall, and wherein an edge of the partial sleeve adjoins a lower end of the transverse wall.

6. The steering knuckle according to claim 5, wherein the transverse wall continues in a partial face adjacent the hub to further support a caliper bracket adapted for affixing a brake caliper thereto.

7. The steering knuckle according to claim 4, further comprising a supporting wall at a lower end of the partial sleeve which extends tangentially to the side and at an outward end of which is formed a fixing eye.

8. The steering knuckle according to claim 7, wherein the bracket wall extends downward into a strut which substantially perpendicularly abuts the supporting wall.

9. The steering knuckle according to claim 7, further comprising at the lower end of the partial sleeve a bearing eye wherein between the bearing eye and the fixing eye extends a base wall below the supporting wall and perpendicularly to the supporting wall.

10. The steering knuckle according to claim 1, wherein one end of the bridge that is adjacent the hub has a width which substantially corresponds to a diameter of the hub, and another end of the bridge that is adjacent the bracket has a width which substantially corresponds to a width of the bracket.

* * * * *